(12) United States Patent
Durward

(10) Patent No.: US 10,794,161 B2
(45) Date of Patent: Oct. 6, 2020

(54) BIDIRECTIONAL ELECTROMAGNETIC PROPELLED THRUSTER DEVICE FOR USE IN TUBULARS

(71) Applicant: Pep Energy Systems Ltd., Millarville (CA)

(72) Inventor: Robert Bonthron Durward, Millarville (CA)

(73) Assignee: Pep Energy Systems Ltd., Millarville (CA)

( * ) Notice: Subject to any disclaimer, the term of this patent is extended or adjusted under 35 U.S.C. 154(b) by 205 days.

(21) Appl. No.: 15/927,310

(22) Filed: Mar. 21, 2018

(65) Prior Publication Data

US 2018/0283147 A1    Oct. 4, 2018

Related U.S. Application Data

(60) Provisional application No. 62/477,901, filed on Mar. 28, 2017.

(51) Int. Cl.
| | |
|---|---|
| *E21B 43/12* | (2006.01) |
| *E21B 34/08* | (2006.01) |
| *E21B 47/12* | (2012.01) |
| *F16L 55/30* | (2006.01) |
| *F16L 55/11* | (2006.01) |
| *E21B 33/12* | (2006.01) |

(52) U.S. Cl.
CPC ............ *E21B 43/121* (2013.01); *E21B 34/08* (2013.01); *E21B 47/12* (2013.01); *F16L 55/30* (2013.01); *E21B 33/1208* (2013.01); *F16L 55/11* (2013.01)

(58) Field of Classification Search
CPC ........ E21B 43/121; E21B 43/12; E21B 47/12; E21B 47/065; E21B 47/011; E21B 34/08; E21B 33/1208; F16L 55/30; F16L 55/11
See application file for complete search history.

(56) References Cited

U.S. PATENT DOCUMENTS

| | | | |
|---|---|---|---|
| 3,585,423 | A | 6/1971 | Bolton et al. |
| 3,768,417 | A | 10/1973 | Thornton et al. |
| 3,770,995 | A | 11/1973 | Eastham et al. |
| 3,857,132 | A | 12/1974 | Knapp |
| 4,437,799 | A | 3/1984 | Liu et al. |

(Continued)

FOREIGN PATENT DOCUMENTS

| | | |
|---|---|---|
| JP | 11116051 | 4/1999 |
| WO | 86/01751 | 3/1986 |

*Primary Examiner* — Michael R Wills, III
(74) *Attorney, Agent, or Firm* — Nathan V. Woodruff

(57) ABSTRACT

A fluid transport system has electromagnetic elements spaced along a tubular that are controlled by a controller. A fluid thruster is provided in the tubular and has a thruster body having a downstream end and an upstream end, and a magnetic element carried by the thruster body. A valve member is carried by the thruster body that is actuatable between an open position that permits fluid flow to traverse the thruster body, and a closed position that prevents fluid flow to traverse the thruster body, in response to fluid pressure. The controller sequentially activates the electromagnetic elements to propel the fluid thruster in either the upstream direction or the downstream direction. In the upstream direction, the valve member is moved to the open position, and in the downstream direction, the valve member is moved to the closed position.

15 Claims, 7 Drawing Sheets

(56) References Cited

U.S. PATENT DOCUMENTS

| | | |
|---|---|---|
| 5,270,593 A | 12/1993 | Levi et al. |
| 5,868,077 A | 2/1999 | Kuznetsov |
| 5,903,945 A | 5/1999 | Lundie |
| 5,924,158 A | 7/1999 | Watts |
| 5,957,200 A * | 9/1999 | Majek ................ E21B 34/16 137/624.15 |
| 6,044,770 A | 4/2000 | Davey et al. |
| 6,450,103 B2 | 9/2002 | Svensson |
| 6,500,271 B1 | 12/2002 | Moore et al. |
| 6,613,261 B2 | 9/2003 | Knapp |
| 6,651,744 B1 | 11/2003 | Crawford |
| 6,679,129 B2 | 1/2004 | Savard |
| D491,325 S | 6/2004 | Hawkins |
| 6,769,321 B1 | 8/2004 | Appleton |
| 6,792,641 B1 | 9/2004 | Laker |
| 6,857,329 B2 | 2/2005 | Savard |
| 6,874,193 B2 | 4/2005 | Pruett |
| 7,000,280 B1 | 2/2006 | Knapp |
| 7,500,834 B2 | 3/2009 | Durward |
| 7,591,308 B2 * | 9/2009 | Bender ................ E21B 43/00 166/105.5 |
| 8,316,500 B2 | 11/2012 | Freeman |
| 8,358,134 B1 * | 1/2013 | Hoyt ................ E21B 47/0905 324/326 |
| 2002/0040657 A1 | 4/2002 | Davey |
| 2002/0178965 A1 | 12/2002 | Davey |
| 2013/0319661 A1 * | 12/2013 | Xiao ................ E21B 43/121 166/250.03 |
| 2015/0000761 A1 * | 1/2015 | Jefferies ................ E21B 34/08 137/15.08 |
| 2016/0312589 A1 * | 10/2016 | Decarlo ................ E21B 43/121 |

\* cited by examiner

BIDIRECTIONAL ELECTROMAGNETIC PROPELLED THRUSTER DEVICE FOR USE IN TUBULARS

FIELD

This relates to methods of moving product, typically a fluid, such as a gas, a liquid, a combination of gas and liquid, or a fluidized solid, through tubulars using an electromagnetically propelled thruster device that is capable of travelling bidirectionally in the tubular.

BACKGROUND

When transporting fluid, piping, pipelines, etc. may be used when transporting from one geographic location to another, or production tubing, etc. may be used when transporting fluid from an underground formation to surface.

In a pipeline, the two major methods of moving product are: firstly, the pressure driven pipeline system that relies on compressors or pumps, which are large and expensive and use a lot of energy to move the product and; secondly, propelled devices that push or displace the product.

In a producing reservoir, artificial lift devices are typically used to help produce fluid from wells that are subterranean by pushing fluid through a string of production tubing, such as water or hydrocarbons. Pumps like electric submersible pumps or PCP's or equivalent typically draw the produced fluid from the reservoir at or near the depth of the reservoir.

SUMMARY

According to an aspect, there is provided a fluid transport system. The system comprises a tubular transporting fluid in a downstream direction from a fluid source to a fluid destination. The tubular comprises a plurality of electromagnetic elements spaced along a length of the tubular, each electromagnetic element being selectively energized by a source of electrical energy that is controlled by a controller. A fluid thruster is disposed within the tubular, the fluid thruster comprising: a thruster body having a downstream end and an upstream end, the downstream end facing in the downstream direction; a magnetic element carried by the thruster body; and a valve member carried by the thruster body, the valve member being actuatable between an open position that permits fluid flow to traverse the thruster body, and a closed position that prevents fluid flow to traverse the thruster body, the valve member being actuated from the closed position to the open position in response to fluid pressure applied from the upstream direction and from the open position to the closed position in response to fluid pressure applied from a downstream direction that is opposite to the upstream direction. The controller sequentially activates the electromagnetic elements to apply a motive force to the magnetic element and propel the fluid thruster, the fluid thruster being selectively propelled in either the upstream direction or the downstream direction, wherein, in the upstream direction, the valve member is actuated to the open position to permit fluid to flow past the thruster body, and in the downstream direction, the valve member is actuated to the closed position such that the fluid thruster pushes the fluid in the downstream direction.

According to other aspects, the fluid transport system may include one or more of the following features: there may be a plurality of fluid thrusters spaced at intervals along the tubular, each fluid thruster reciprocating within the tubular along a travel distance; the fluid thruster may comprise angled fins that induce the fluid thruster to rotate as fluid moves past the angled fins; the fluid thruster may carry one or more of the following sensors: a pressure sensor, a temperature sensor, an accelerometer, a velocity sensor, a GPS sensor, a wall thickness sensor, where the fluid thruster may comprise a communication module for communicating sensor data to the controller, and the electromagnetic elements may induce a current in the fluid thruster to power the one or more sensors; the controller may activate the electromagnetic elements based on a sensed location of the fluid thruster within the tubular; the valve member may comprise a ring that slides axially along the fluid thruster in response to fluid pressure in the tubular to open and close one or more fluid paths in the thruster body; the fluid thruster may comprise a sealing anchor that is selectively activated by the controller; the tubular may be a pipeline or a portion of a fluid pump;

The fluid transport system of claim 1, wherein the tubular is a downhole production tubing string.

According to an aspect, there is provided a method of transporting fluid in a tubular, the tubular having a plurality of electromagnetic elements spaced along a length of the tubular, each electromagnetic element being selectively energized by a source of electrical energy that is controlled by a controller, the tubular having a downstream direction that is opposite an upstream direction. The method comprises the steps of: injecting a fluid thruster into the tubular, the fluid thruster comprising a thruster body having a downstream end and an upstream end, the downstream end facing in the downstream direction; a magnetic element carried by the thruster body; and a valve member carried by the thruster body, the valve member being actuatable between an open position that permits fluid flow past the thruster body, and a closed position that prevents fluid flow past the thruster body; activating the electromagnetic elements to apply a motive force to the fluid thrusters in the downstream direction, the fluid causes the valve member to be actuated to the closed position; activating the electromagnetic elements to apply a motive force to the fluid thrusters in the downstream direction, the fluid in the tubular applying pressure in the upstream direction against the valve member and actuating the valve member to the closed position such that the fluid thruster pushes fluid downstream through the tubular; and activating the electromagnetic elements to apply a motive force to the fluid thrusters in the upstream direction, the fluid in the tubular applying pressure in the downstream direction against the valve member and actuating the valve member to the open position such that the fluid thruster travels upstream through the fluid in the tubular.

According to further aspects, the method may comprise one or more of the following aspects: the method may further comprise the steps of providing a plurality of fluid thrusters spaced at intervals along the tubular, and causing each fluid thruster to reciprocate within the tubular along a travel distance; the fluid thruster may comprise angled fins that induce the downstream end of the thruster to rotate as fluid moves past the angled fins when the thruster is moving in the upstream direction; the electromagnetic elements may be activated by a controller and the fluid thruster may carry one or more sensors and senses at least one of fluid pressure within the tubular, temperature within the tubular, acceleration of the fluid thruster, fluid velocity relative to the fluid thruster, a location of the fluid thruster, and a thickness of a wall of the tubular, and further comprising the step of communicating sensed data to the controller, and the electromagnetic elements may induce a current in the fluid thruster to power the one or more sensors; the method may further comprise the step of sensing a location of the fluid thruster within the tubular, and activating the electromagnetic elements based on the sensed location of the fluid thruster; the valve member may comprise a ring that slides axially along the fluid thruster between the open position and the closed position; the method may further comprise the step of activating a sealing anchor carried by the fluid thruster from a retracted position to an anchored position that seals the fluid thruster against the tubular; and the tubular may be a pipeline, a downhole production tubing string, or a component of a pump.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
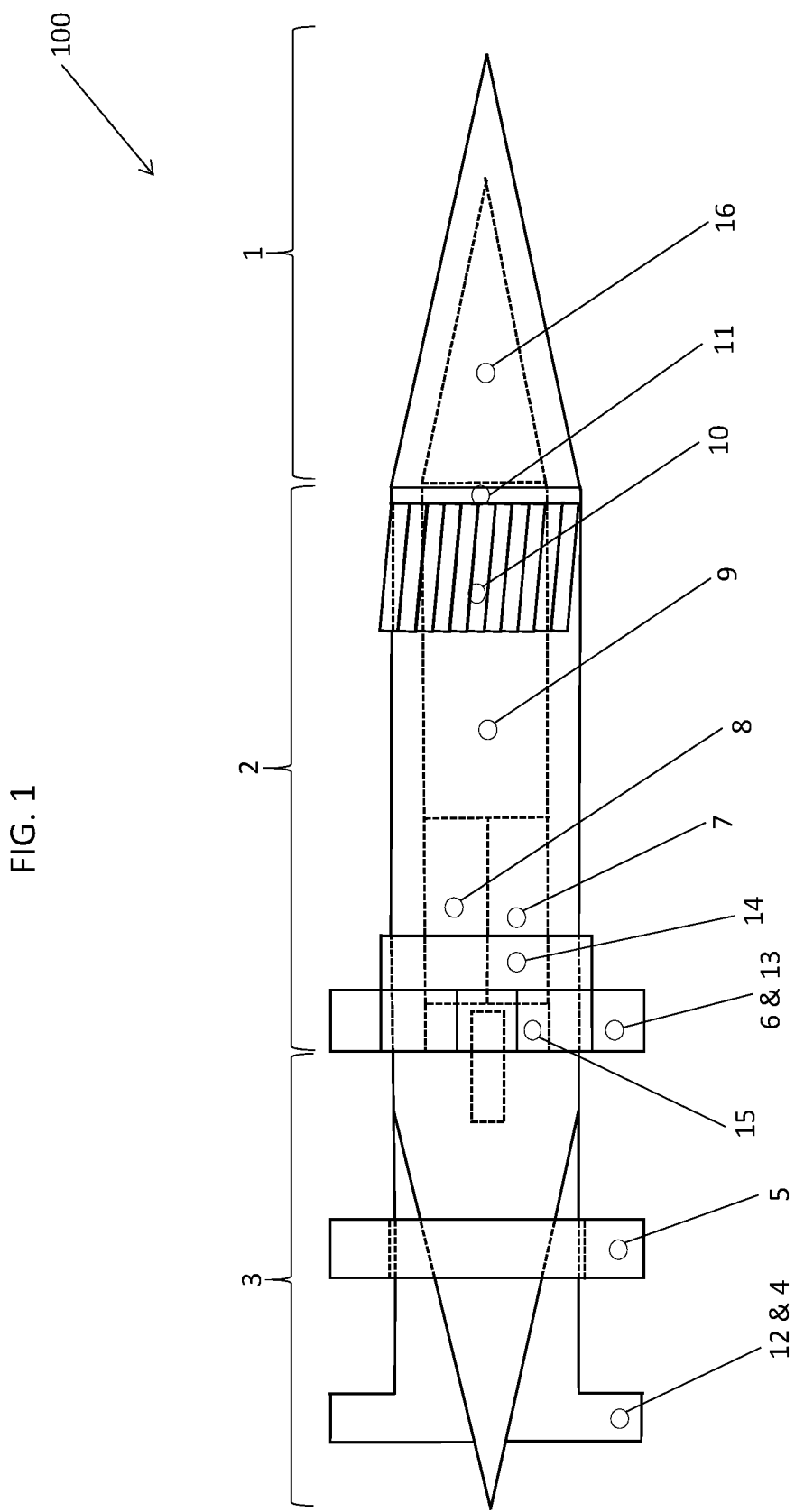
FIG. 1 is a side elevation view of a thruster element.
Figure 4:
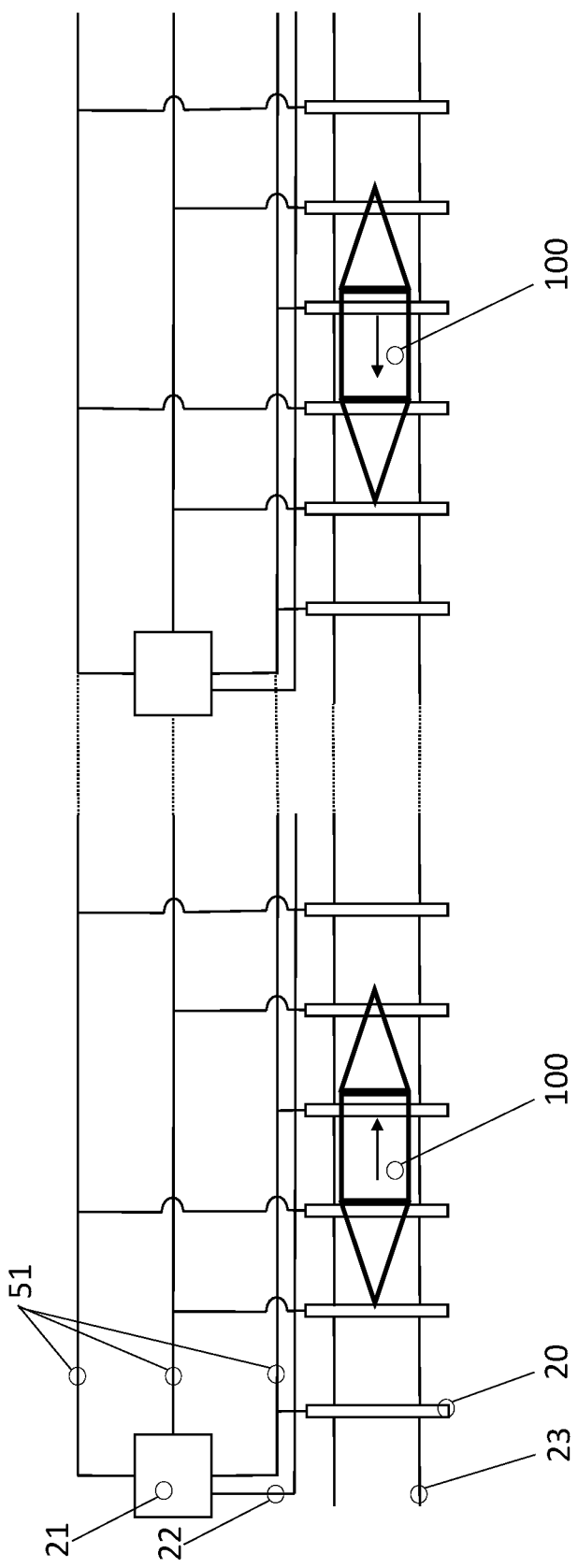
FIG. 4 is a schematic view of a tubular with electromagnetic elements and with multiple thruster elements positioned within the tubular, and a controller connected to the electromagnetic elements.
Figure 5:
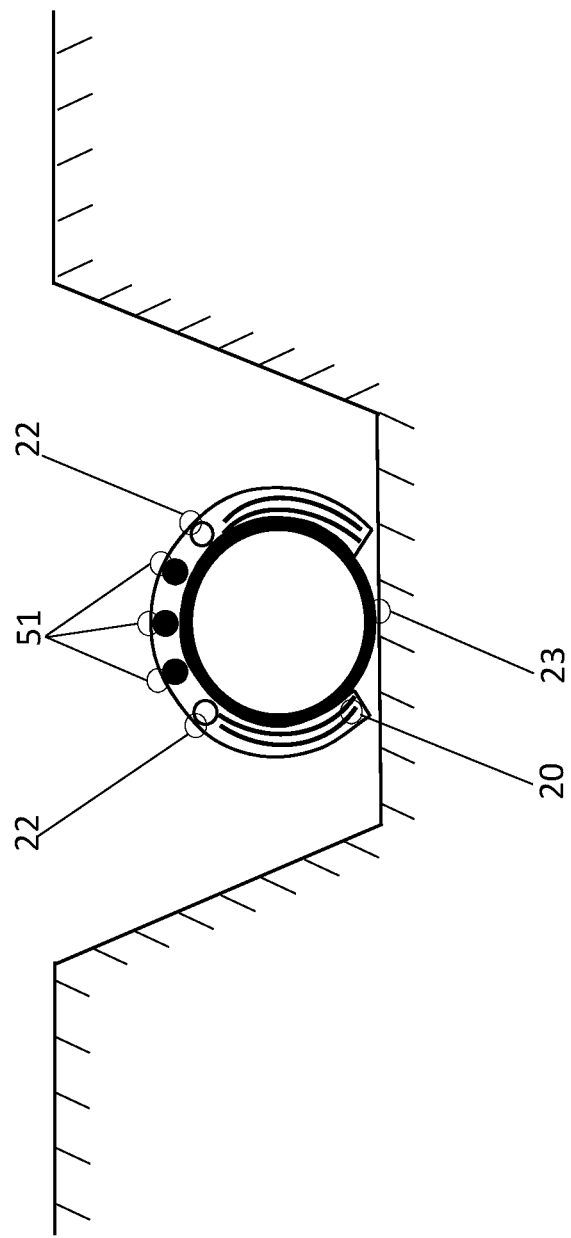
FIG. 5 is a front elevation view in section of a pipeline showing power and communication lines and electromagnetic elements.

There will now be described a bidirectional electromagnetic propelled thruster device (BETD), generally indicated by reference number 100, and an example of which is shown in FIG. 1, for use in a fluid transport system that uses tubulars. The BETD 100 may be used in different types of fluid transport systems. An example of a pipeline system with BETD elements 100 is shown in FIGS. 4 and 5, and an example of a fluid production systems from a downhole well with BETD elements 100 is shown in FIGS. 6(a), (b) and (c). As will be discussed below, the fluid is produced using production tubing, which may be a liner, coiled tubing, or other tubing string, as is known in the art.

Figure 2:
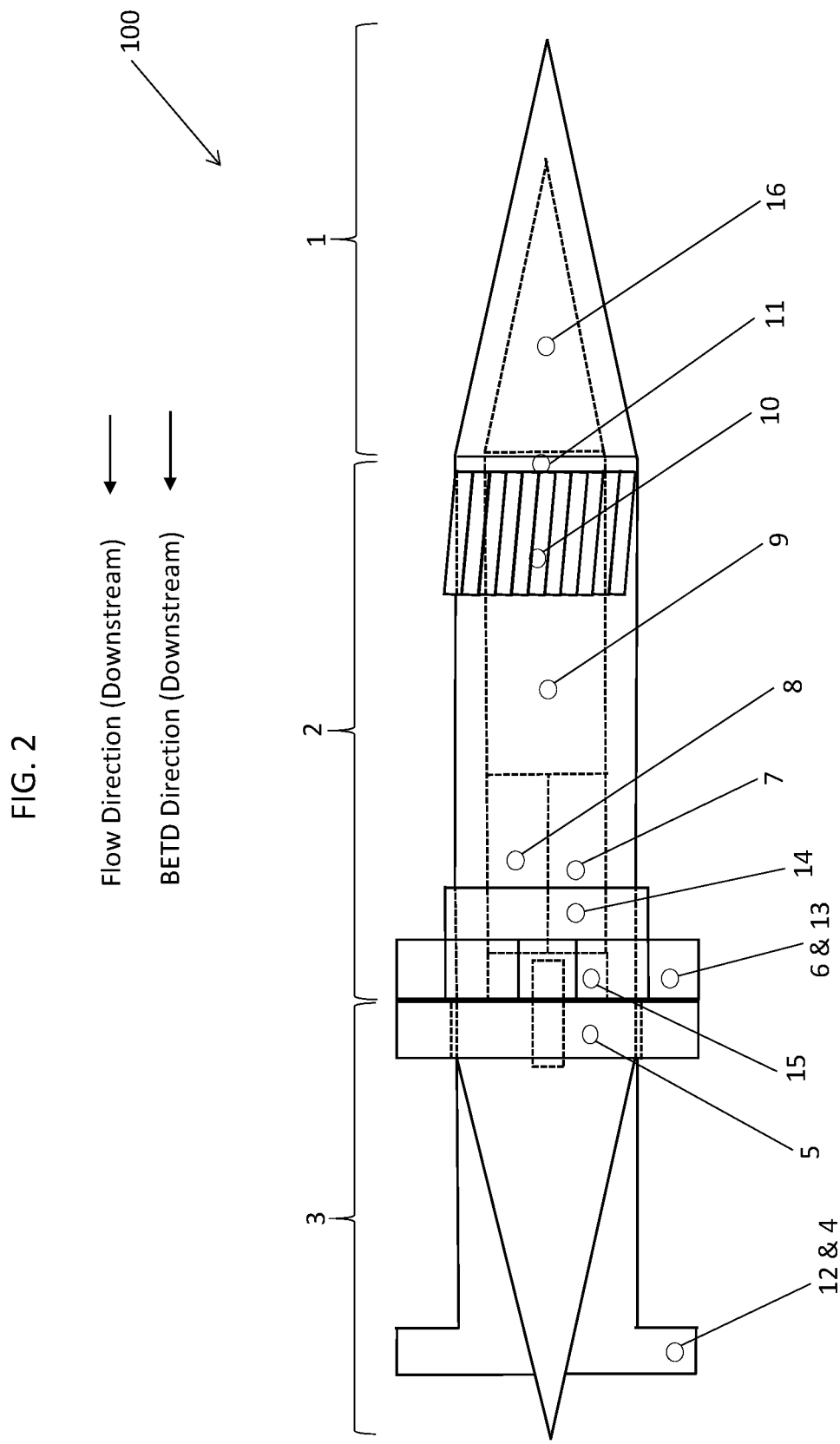
FIG. 2 depicts an example of a thruster element in a configuration being propelled downstream.
Figure 3:
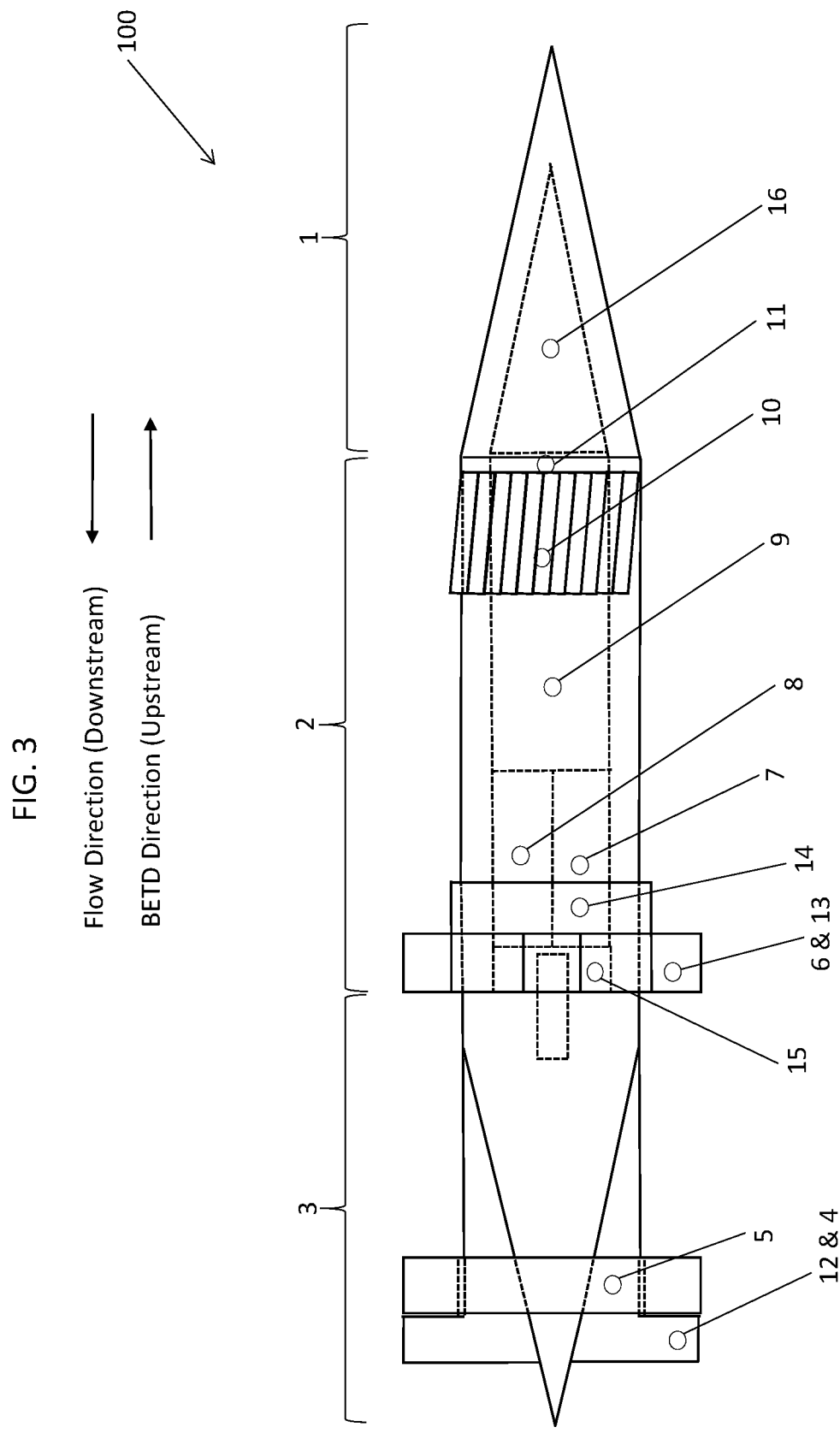
FIG. 3 depicts an example of a thruster element in a configuration being propelled upstream.

The thruster device 100 is designed to move within a tubular in a reciprocating fashion within a particular zone of the tubular or, in longer tubulars, a series of synchronized thruster devices 100 can be incorporated to move product in the tubular. Each thruster device has the capability of moving upstream or downstream within the tubular and acts as a moving check valve within the tubular. When pushing the product forward (downstream direction) as shown in FIG. 2, the thruster device 100 is acting in the closed position. When moving backward (upstream direction) as shown in FIG. 3 the thruster device 100 is acting in the open position allowing product to move through and/or around the thruster device. The thruster device 100 can be used in any tubular fitted with an electromagnetic propulsion system and can be used in any orientation (e.g. pipes, pipelines, wellbores). There are many configurations of the thruster device 100, one of which is described within this application.

Referring to FIG. 4, the BETDs 100 are the second part of a two-part linear motor. Electromagnetic elements 20, such as coils or windings, are placed adjacent to or inside the pipe, and form the first part (stator) of the linear motor. The BETDs 100 are the rotor component of the linear motor, and are generally made up of a body that carries a magnetic element that interacts with the electromagnetic elements, and a valve that is opened and closed by a valve member. A Power and Communications system (P&C System), which lies in proximity to the tubular in which the BETD 100 is positioned, acts as a controller for the stator, such as to control and provide power to the stator and provide communication to the fluid transport system's control centre, or other communication device.

When the electromagnetic elements, such as may be formed from wire coils or windings, are sequentially activated, they generate a traveling electromagnetic field that propels the BETD 100 and thus pushes the product through the tubular from the source to the destination, i.e. in the downstream direction. In one example, the electromagnetic elements may be sequentially activated by using alternating current in groups of three, with each of the three electromagnetic elements getting a different phase of current. In another example, the electromagnetic elements may be activated by a pulsing direct current. Other designs may also be possible that apply a suitable motive force to the BETD 100 through the tubular. When the current is reversed, the BETD 100 reverses direction, moving in the upstream direction, at the same velocity as it was moving downstream. The BETD 100 moves upstream (i.e. toward the fluid source relative to the destination), without impeding product flow, because of a mechanical action that takes place on the BETD 100. Referring to FIG. 1, a valve member is actuated to allow fluid to pass by the body of the BETD 100. While the valve member may take various forms and may be actuated in different ways, in the depicted example, this mechanical action consists of a moveable ring 5 that slides back until it is eventually stopped by the "L" shaped retainers 12. The sliding ring's 5 movement creates a large orifice, between the body of the BETD 100 and the inside circumferential surface of the sliding ring. The product passes over the body of the BETD 100 on the upstream and center sections and then interacts with the fins 4 on the downstream section. The fins 4 are preferably curved, or have a slight helical twist, such that interaction between the fins 4 and the product causes the downstream section to spin and increase the product's speed through the orifice.

In the context of a pipeline, the reciprocating use of the BETD 100 eliminates both the requirement of removing a device from the end of the pipeline and the transportation system required to transport the device back to the start of the pipeline for reinsertion. In the context of a wellbore, the reciprocating use of the BETD 100 makes it possible to return the BETD 100 downhole, which is generally inaccessible from the outside.

The BETDs 100 may also be used to provide real time data to a fluid system operator. The BETD 100 may be provided with instrumentation, such as sensors, transmitters, and receivers, located on or in the BETD 100, that interface, by way of the P&C System, with a Pipeline Operating System, Wellbore Operating System, or other Fluid Transport System. to provide real time information to the operator. This allows the operator to monitor the system, and modify the operation or take any corrective steps to optimize performance or to minimize potential failure. In the context of a pipeline, if such a failure does take place, the BETDs 100 may be designed and operated in such a way that product loss can be minimized by using the BETDs 100 to seal or minimize fluid flow through the pipeline. The BETDs 100 also enable the operator, in real time, to accelerate or decelerate the flow of the product to better align with the throughput demand.

An example of a BETD 100 will now be described. It will be understood that this is by way of example only, and that other designs may be used to achieve similar results.

The depicted BETD 100 is cylindrically shaped and fits lengthwise inside a tubular. The BETD's dimensions are determined based on the inside diameter of the tubular and, if the BETD 100 will travel along a curved section, the bend radius of bends in the tubular. FIG. 1 provides a side elevation of the BETD 100. FIG. 4 is a schematic representation of a tubular, in the form of a pipeline, the P&C System, the coils/windings on the exterior of the tubular, and the BETD 100 located in the interior of the tubular. The BETD 100 can be considered as having three sections identified in FIG. 1 as an upstream section 1, a centre section 2, and a downstream section 3. The upstream section 1 is so named because when the BETD 100 is moving upstream against the product flow it is the most forward section. Conversely, the downstream section 3 is so named because when the BETD 100 is moving downstream pushing product, this is the most forward section. The centre section 2 is so named because it is located between the upstream section 1 and the downstream section 3.

The depicted BETD 100 has a bull nosed tip located at the front end of the upstream section 1. The circumference of the tip increases, gradually and incrementally, forming a cone whose rear circumference is equal to the consistent circumference of the centre section 2. An auxiliary chamber 16 may be provided, such as located inside the upstream section 1 as shown, which may be used for additional sensors, instrumentation or magnet placement, etc. Preferably, the BETD 100 is provided with a sealing anchor that may be actuated. As shown, the sealing anchor includes two shutter clamps 11 located at the back of the upstream section 1 and connected to a multitude of shutters 10 located around the circumference of the BETD 100. When the operator activates the shutter clamps, the shutters rotate outward from the BETD 100 and create a complete seal between the BETD 100 and the inner surface of the tubular.

The centre section 2 of the BETD 100 is cylindrically shaped and has a smaller circumference than the interior circumference of the tubular. In one example, the circumference may be about 75% or less than the interior circumference of the tubular. The magnet chamber 9 is located closest to the upstream section 1 and houses the magnets (either induction or permanent magnets). The generator chamber 8 and the instrumentation chamber 7 share the remaining interior space of the centre section 2. A spoked fixed ring 6 is located at the downstream end of the centre section 2. The spoked fixed ring 6 stops the sliding ring 5 from moving further forward onto the centre section 2, when the BETD 100 is moving forward and pushing product in the downstream direction. As the sliding ring 5 is pushed tight against the fixed spoked ring 6, a partial seal is formed, and this enables the BETD 100 to work as a piston and push product in the downstream direction, as shown in FIG. 2. The outer circumference of the sliding ring 5 is slightly smaller than the inside circumference of the tubular. When the BETD 100 is moving in the downstream direction, and the sliding ring 5 is tight against the fixed ring 6 with spokes 13, the swivel bearing 15 is not actuated, preventing the downstream section 3 from rotating. Next to the fixed spoked ring 6 on the centre section side, is the sensor ring 14 that may house several sensors, such as pipe wall thickness sensors, temperature sensors, and pressure sensors., or others.

The circumference of the downstream section 3 closest to the centre section 2, is the same circumference as the centre section 2 and this circumference gradually decreases to form a bull nosed tip at the end of the downstream section 3. A plurality of fins 4 start at the interface of the centre and downstream sections and run lengthwise along the downstream section 3, gradually becoming taller as the cone shaped downstream section 3 gradually decreases in circumference. When the BETD 100 changes direction and moves in the upstream direction, the "L" shaped retainers 12 located at the tail end of the fins, stops the sliding ring 5 from continuing to slide back, as shown in FIG.3. The fins 4 are preferably askew from the centreline of the BETD 100. This causes the downstream section 3 to rotate as the BETD 100 moves in the upstream direction due to the product's angular contact with the fins 4. This rotation accelerates the product flow through the orifice formed between the body of the BETD 100 and the inside circumference of the sliding ring 5.

The sensors, located on sensor ring 14 and in the BETD instrumentation chamber 7, allow the BETD 100, by way of P&C System, discussed below, to interface with the Operating System providing real time information to the operator. The onboard sensors transmit pressure, temperature, and velocity information through the fibre optics cable to the power generating stations located along the tubular. Information is then sent from the power generating stations via a communications system to the operator's control room. Onboard GPS sensors track the BETD's location and it is communicated to the operator's control room in the same manner. Conversely, the operator uses the communications system to control the location, speed, and other features of the BETD 100.

The tubing wall sensors located on the sensor ring 14, may interface, by way of the P&C System, with the Operating System to provide the operator with a real-time data history of the tubing wall thickness. The operator may then be alerted if the tubing wall thickness becomes unacceptably thin, allowing the operator to initiate corrective action. The operator, using data from the GPS sensors in the BETDs 100 can direct the BETDs 100 to move, in either direction, to the location where the corrective action is to take place. The operator can then stop the BETDs 100, by stopping the movement of the electromagnetic field. The operator can then activate the shutter clamps 11 to compress causing the shutters to rotate outward from the BETD 100 to form a complete seal between the body of the BETD 100 and the interior of the tubing.

Pressure sensors located in the sensor ring 14 on the BETD 100 alert the operator to changes in fluid pressure within the tubular in real time, which may require the operator to suspend product flow in the tubular.

Devices that affect the viscosity and density of the fluid may be located in the auxiliary chamber 16 and/or inside the downstream section 3. Such devices may include, for example, a frequency generator and or heater.

In the context of a pipeline, and with reference to FIG. 4, the P&C System 21, another key component of the electromagnetic propulsion system, lies above ground and provides the communications network between the operator's control panel, flow computers, variable frequency devices, coils and BETDs 100. Preferably, the power supply 51 and communications cables 22 that are connected to the P&C System 21 can deliver power and communication information, in both directions; thereby providing a redundancy for both power and data in the event of a severance of the P&C System 21. If this P&C System 21 is severed, GPS Sensors immediately alert and inform the operator to the location of the severance. Internal pressure sensors located on the sensor ring 14 of the BETDs 100 may also be used to detect any drop in pressure. With a large drop in pressure in two or more BETDs 100, the entire pipeline system may be programmed to initiate an emergency shutdown that stops product flow. The operator, relying on the GPS sensors in the BETD 100 and the P&C System 21, can then direct the closest BETDs 100 to the ruptured ends of the pipeline failure site and then activate the BETDs shutter clamps 11 to compress in upon themselves, causing the shutters 10 to rotate outward from the BETD 100 to form a complete seal between the BETDs 100 and the tubular 23. This action seals off both ends of the failure site minimizing product loss. FIG. 4 illustrates a series of controllers and BETDs 100 for long pipelines and the other components shown on FIG. 4 include: three phase power supply as part of P&D 21; the tubular 23 through which BETD 100 travels; the electromagnetic elements 20 that provide thrust to the BETDs 100; and the BETDs 100. Note that a pair of BETDs 100 are shown as moving in opposite directions to facilitate constant flow through pipeline 23.

In the context of a pipeline, FIG. 5 provides an example of a cross section of a pipeline application. The propulsion system is contained in a flexible wrap which surrounds the tubular as shown and the components are: the power supply 51; the telecommunications cables 22; the electromagnetic elements 20; and the tubular 23.

Figure 6:
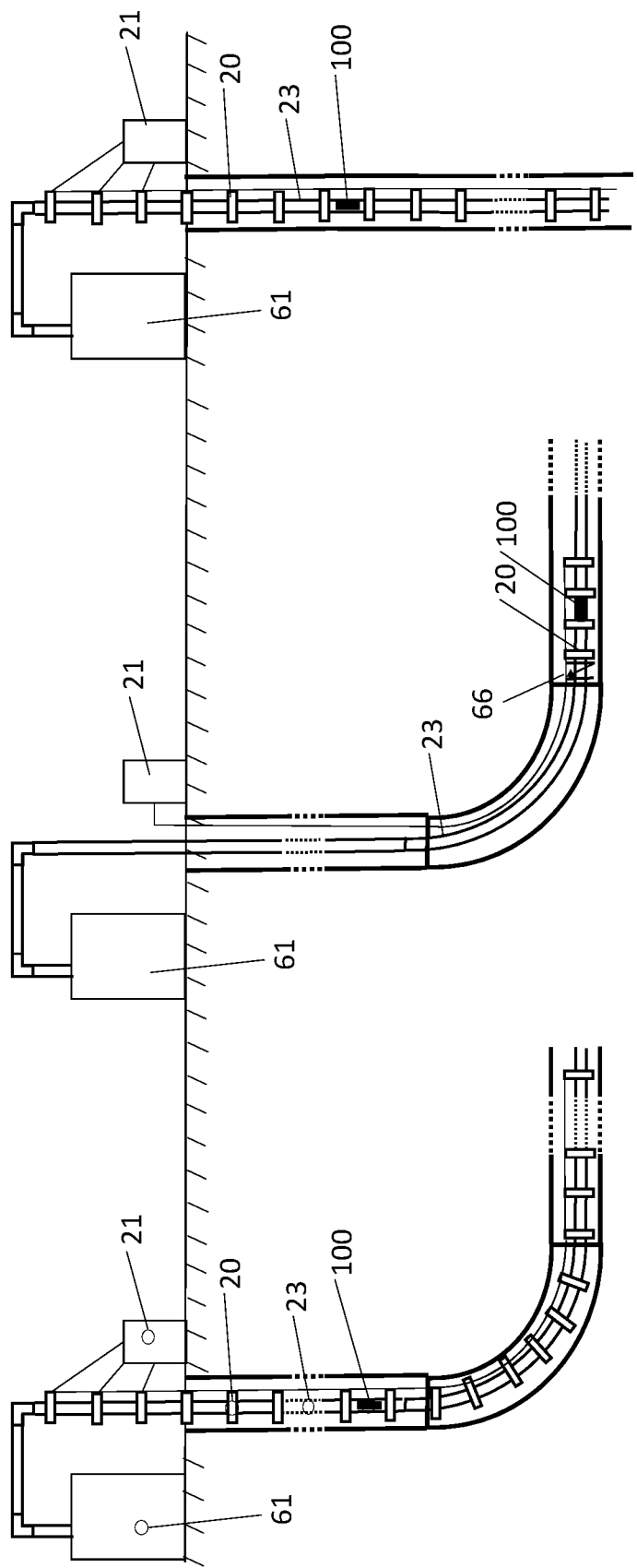
FIG. 6 are schematic views of wellbore applications

In FIGS. 6(*a*), (*b*) and (*c*) the electromagnetic propulsion system, in conjunction with the BETDs 100, can function in a wellbore to move fluid to the surface. The components include: a storage tank 61; the P&C System 21; the electromagnetic elements 20; the production tubing 23; and the BETD 100. In FIG. 6(*a*) the BETD 100 travels along the entire length of the production tubing. There may be a series of BETDs 100 operating in the production tubing 23. In FIG. 6(*b*) the BETD 100 operates at the heel of the horizontal well and a check valve 66 prevents backward flow in the tubing 23; and in FIG. 6(*c*) a vertical well is depicted with the electromagnetic system and a BETD 100 operating within the production tubing 23. In any of these examples, there may be a series of BETDs 100 operating in the production tubing 23. alternatively, by reversing the BETDs, fluid may be pumped into a formation, such as for well treatment operations.

Figure 7:
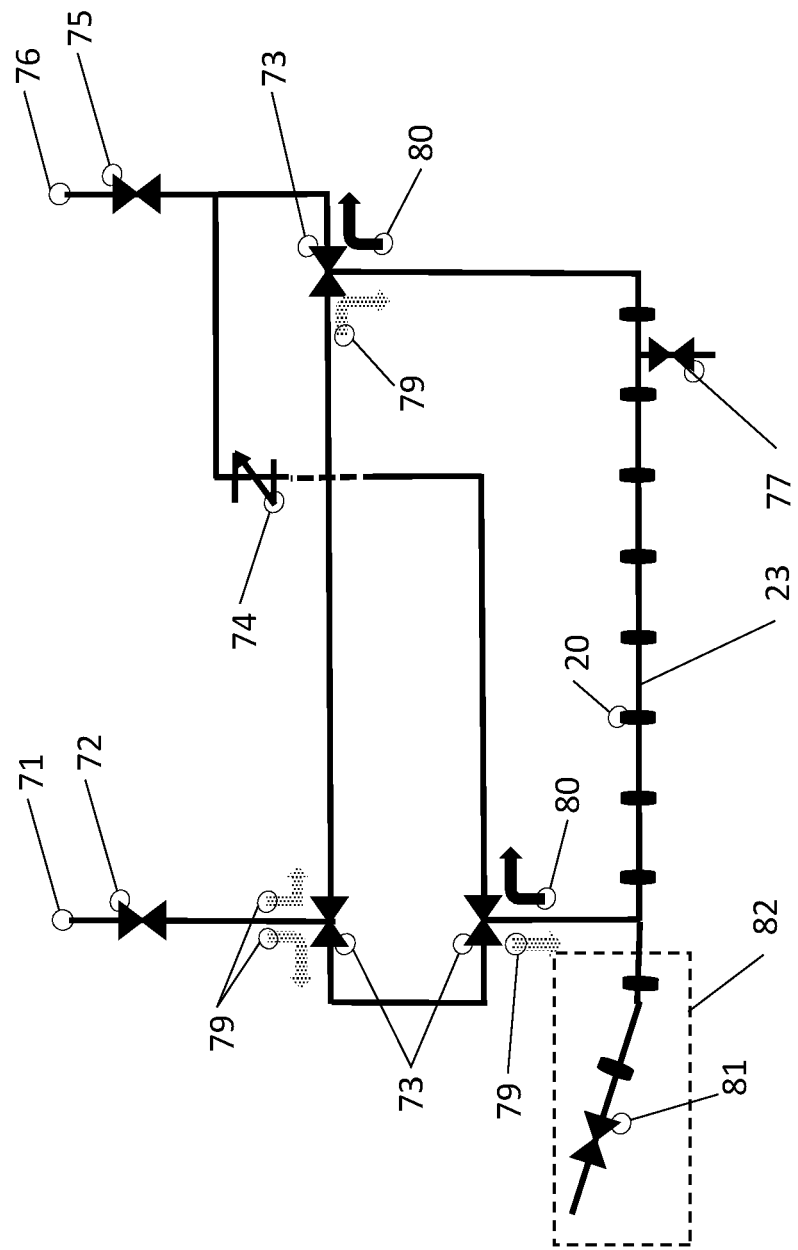
FIG. 7 is a schematic view of an electromagnetic pump application

A similar methodology, can be applied to operate as an above ground EM Pump. A pump can be built on a section of tubing with stainless steel or alternative. The idea is for a single BETD to move in a reciprocating fashion in a section of pipe to create a highly efficient positive displacement pump. As shown in FIG. 7, an example of a pump system may include: an fluid inlet (suction) 71; a fluid outlet (discharge) 76; a launcher/receiver assembly 82 for inserting/extracting the BETD (not shown) with isolation valve 81, automated three-way diverter valves 73, suction and discharge isolation valves 72 and 75, a drain valve 77 to drain the system when not in use, a strategically placed check valve 74 to ensure appropriate fluid flow, and an automated control system (not shown) to direct the flow of fluid within the pump. The BETD functions in the length of tubular 23 and reciprocates back and forth within the pipe fitted with the electromagnetic elements 20. The control system is used to switch the three-way valves 73 to ensure that flow is permitted in the correct direction depending upon the direction of the BETD. Note that low pressure flow 79 is from the inlet and the high pressure flow 80 is directed to the outlet.

Advantages

With respect to a pipeline, a device that moves unidirectionally in a pipeline to move product over long distances is compromised by; firstly, the requirement of removing the device at the end of the pipeline; and secondly, by the subsequent transportation system required to return the unidirectional device to the start of the pipeline for reinsertion to again move product. With respect to production tubing in a well, it is also difficult to remove a device from the production tubing, and very difficult to return the device further down the well. In contrast, a bidirectional propelled thruster device as described herein may be used to push product in a tubular at a desired velocity in the downstream direction, and then reverse direction and move in the upstream direction. The BETD eliminates both the need to remove the unidirectional device when it arrives at the end of the tubular and the need to provide a transportation system to return the device upstream for reinsertion. Furthermore, the controller used to control the electromagnetic devices that propel the BETD in the tubular may enable an operator, in real time, to accelerate or decelerate the flow of the product through the tubular, such as to better align with throughput demand, or adapt to changing conditions.

In addition, as pipelines or wellbores age, the integrity of the pipe or tubing has become more important to operators, particularly with pipelines, which may be used to transport fluid over a long period of time. Pipeline regulators are also insisting on strict regulatory compliance to minimize pipeline failures and the environmental degradation accompanying such failures. The device described herein may be used as part of a tubular integrity data information system that can provide operators with real time monitoring of the tubular. This data would enable the operator to take corrective action before a failure takes place and if a failure does take place, the operator may be able to take immediate corrective action if the BETD has been designed with the ability to immediately seal off the tubing failure site to minimize product loss and environmental damage.

What is claimed is:

1. A fluid transport system, comprising:
a pipeline transporting fluid in a downstream direction from one geographic location to another, the pipeline comprising a plurality of electromagnetic elements spaced along a length of the pipeline, each electromagnetic element being selectively energized by a source of electrical energy that is controlled by a controller; and
a plurality of fluid thrusters disposed within and spaced at intervals along the pipeline, each fluid thruster comprising:
a thruster body having a downstream end and an upstream end, the downstream end facing in the downstream direction;
a magnetic element carried by the thruster body; and
a valve member carried by the thruster body, the valve member being actuatable between an open position that permits fluid flow to traverse the thruster body, and a closed position that prevents fluid flow to traverse the thruster body, the valve member being actuated from the closed position to the open position in response to fluid pressure applied from the upstream direction and from the open position to the closed position in response to fluid pressure applied from a downstream direction that is opposite to the upstream direction;
wherein the controller sequentially activates the electromagnetic elements to apply a motive force to the magnetic element and propel each fluid thruster, each fluid thruster being selectively propelled in either the upstream direction or the downstream direction, wherein, in the upstream direction, the valve member is actuated to the open position to permit fluid to flow past the thruster body, and in the downstream direction, the valve member is actuated to the closed position such that the fluid thruster pushes the fluid in the downstream direction, each fluid thruster reciprocating independently within the pipeline.

2. The fluid transport system of claim 1, wherein each fluid thruster comprises angled fins that induce the respective fluid thruster to rotate as fluid moves past the angled fins.

3. The fluid transport system of claim 1, wherein at least one fluid thruster carries one or more of the following sensors: a pressure sensor, a temperature sensor, an accelerometer, a velocity sensor, a GPS sensor, a wall thickness sensor.

4. The fluid transport system of claim 3, wherein the at least one fluid thruster comprises a communication module for communicating sensor data to the controller.

5. The fluid transport system of claim 3, wherein the electromagnetic elements induce a current in the plurality of fluid thrusters to power the one or more sensors.

6. The fluid transport system of claim 1, wherein the controller activates the electromagnetic elements based on a sensed location of each fluid thruster within the pipeline.

7. The fluid transport system of claim 1, wherein each valve member comprises a ring that slides axially along the respective fluid thruster in response to fluid pressure in the pipeline to open and close one or more fluid paths in the respective thruster body.

8. The fluid transport system of claim 1, wherein each fluid thruster comprises a sealing anchor that is selectively activated by the controller.

9. A method of transporting fluid in a pipeline from one geographic location to another, the pipeline having a plurality of electromagnetic elements spaced along a length of the pipeline, each electromagnetic element being selectively energized by a source of electrical energy that is controlled by a controller, the pipeline having a downstream direction that is opposite an upstream direction, the method comprising the steps of:
injecting a plurality of fluid thrusters into the pipeline, each fluid thruster comprising:
a thruster body having a downstream end and an upstream end, the downstream end facing in the downstream direction;
a magnetic element carried by the thruster body; and
a valve member carried by the thruster body, the valve member being actuatable between an open position that permits fluid flow past the thruster body, and a closed position that prevents fluid flow past the thruster body;
spacing the plurality of fluid thrusters at intervals along the pipeline;
causing each fluid thruster to reciprocate independently within the pipeline by, for each fluid thruster:
activating the electromagnetic elements to apply a motive force to the fluid thruster in the downstream direction, the fluid in the pipeline applying pressure in the upstream direction against the valve member and actuating the valve member to the closed position such that the fluid thruster pushes fluid downstream through the pipeline; and
activating the electromagnetic elements to apply a motive force to the fluid thruster in the upstream direction, the fluid in the pipeline applying pressure in the downstream direction against the valve member and actuating the valve member to the open position such that the fluid thruster travels upstream through the fluid in the pipeline.

10. The method of claim 9, wherein the fluid thruster comprises angled fins that induce the downstream end of the thruster to rotate as fluid moves past the angled fins when the thruster is moving in the upstream direction.

11. The method of claim 9, wherein at least one the fluid thruster carries one or more sensors and senses at least one of fluid pressure within the pipeline, temperature within the pipeline, acceleration of the fluid thruster, fluid velocity relative to the fluid thruster, a location of the fluid thruster, and a thickness of a wall of the pipeline, and further comprising the step of communicating sensed data to the controller.

12. The method of claim 11, wherein the electromagnetic elements induce a current in the at least one fluid thruster to power the one or more sensors.

13. The method of claim 9, further comprising the step of sensing a location of the plurality of fluid thrusters within the pipeline, and activating the electromagnetic elements based on the sensed location of each fluid thruster.

14. The method of claim 9, wherein the valve member comprises a ring that slides axially along the respective fluid thruster between the open position and the closed position.

15. The method of claim 9, further comprising the step of activating a sealing anchor carried by one or more fluid thruster from a retracted position to an anchored position that seals the respective fluid thruster against the pipeline.

* * * * *